United States Patent
Yang et al.

(10) Patent No.: US 10,491,418 B2
(45) Date of Patent: Nov. 26, 2019

(54) CAN CONTROLLER AND DATA TRANSMISSION METHOD USING THE SAME

(71) Applicant: ELECTRONICS AND TELECOMMUNICATIONS RESEARCH INSTITUTE, Daejeon (KR)

(72) Inventors: Jeongmin Yang, Busan (KR); Sung Weon Kang, Daejeon (KR); Young-Su Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 39 days.

(21) Appl. No.: 15/823,104

(22) Filed: Nov. 27, 2017

(65) Prior Publication Data
US 2018/0159699 A1   Jun. 7, 2018

(30) Foreign Application Priority Data

Dec. 5, 2016 (KR) .................. 10-2016-0164677
Sep. 29, 2017 (KR) .................. 10-2017-0128073

(51) Int. Cl.
*H04L 12/40* (2006.01)
*H04L 12/413* (2006.01)
*H04L 12/863* (2013.01)

(52) U.S. Cl.
CPC .... *H04L 12/40032* (2013.01); *H04L 12/4135* (2013.01); *H04L 47/6245* (2013.01);
(Continued)

(58) Field of Classification Search
CPC .................. H04L 12/40032; H04L 13/4135
See application file for complete search history.

(56) References Cited

U.S. PATENT DOCUMENTS

| 7,818,460 B2 | 10/2010 | Kim et al. |
| 2011/0007759 A1* | 1/2011 | Dawson ................ H04L 12/413 370/498 |

(Continued)

FOREIGN PATENT DOCUMENTS

| EP | 2521319 A1 | 11/2012 |
| EP | 2 800 316 A1 | 11/2014 |
| JP | 2016-522616 A | 7/2016 |

*Primary Examiner* — Zachary K Huson
(74) *Attorney, Agent, or Firm* — Rabin & Berdo, P.C.

(57) ABSTRACT

Provided are Controller Area Network (CAN) controller and a data transmission method using the same. The CAN controller includes a receiver, a reception First in First out (FIFO) memory, a transmission FIFO memory, and a transmitter. The receiver is configured to analyze reception information received from a CAN bus according to a set protocol. The reception FIFO memory is configured to store the reception information to be overwritten on previously stored reception information based on identification data of the reception information and a bus load. The transmission FIFO memory is configured to store the transmission information to be overwritten on previously stored transmission information based on identification data of the transmission information and a processor load of the processor. The transmitter is configured to set the protocol and transmit the transmission information stored in the transmission FIFO memory to the CAN bus.

18 Claims, 10 Drawing Sheets

(52) U.S. Cl.
CPC ............... *G05B 2219/25032* (2013.01); *H04L 2012/40215* (2013.01)

(56) References Cited

U.S. PATENT DOCUMENTS

2015/0055473 A1    2/2015  Moriya
2016/0295001 A1   10/2016  Yun et al.

\* cited by examiner

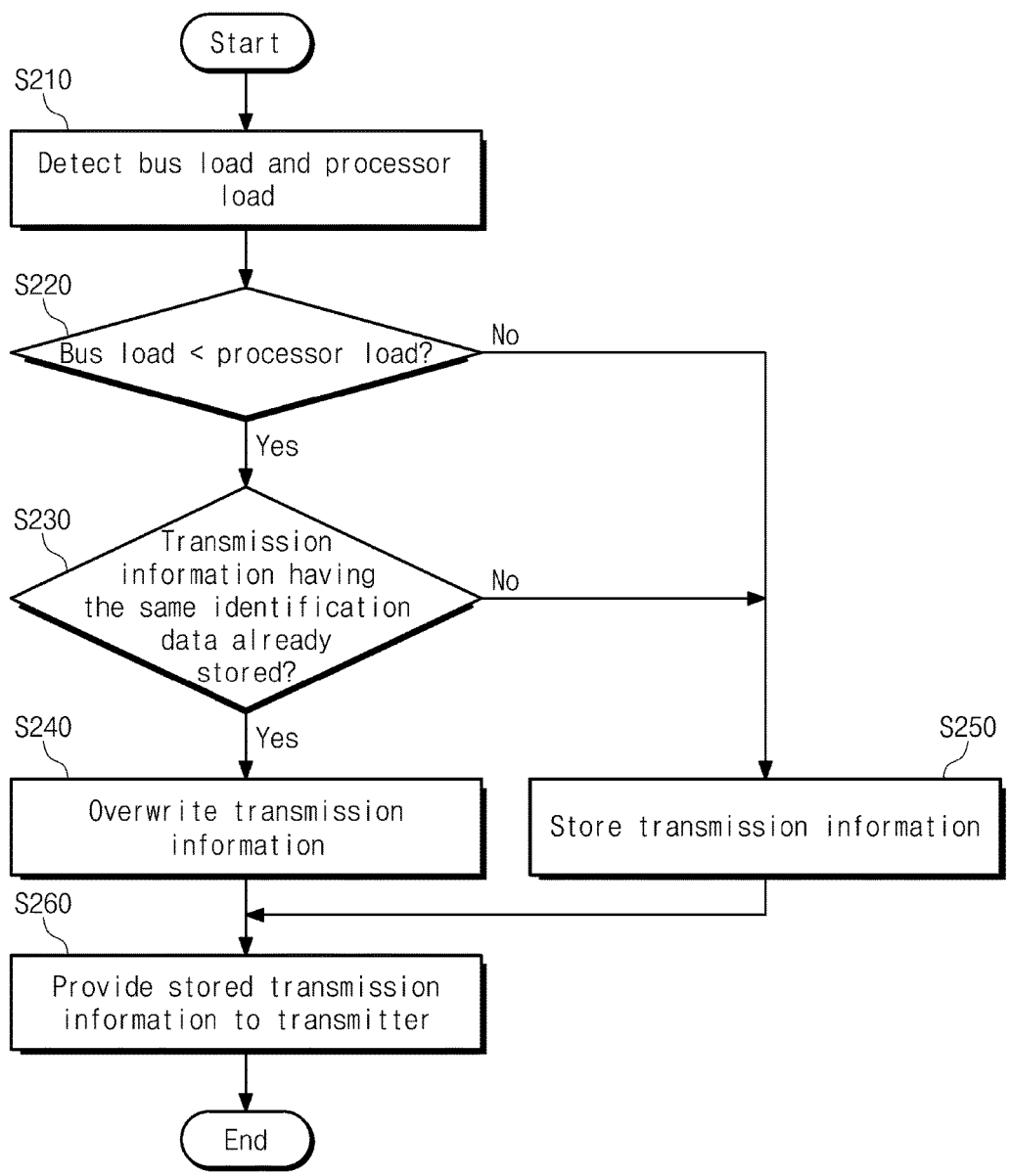

CAN CONTROLLER AND DATA TRANSMISSION METHOD USING THE SAME

CROSS-REFERENCE TO RELATED APPLICATIONS

This U.S. non-provisional patent application claims priority under 35 U.S.C. § 119 of Korean Patent Application Nos. 10-2016-0164677, filed on Dec. 5, 2016, and 10-2017-0128073, filed on Sep. 29, 2017, the entire contents of which are hereby incorporated by reference.

BACKGROUND

The present disclosure relates to an architecture supporting a Controller Area Network (CAN), i.e., a vehicle network standard, and more particularly, to a CAN controller and a data transmission method using the same.

A Controller Area Network (CAN) as a vehicle network protocol for communication between an Electronic Control Unit (ECU) or peripheral electronic equipment in a vehicle system is used as a standard communication standard. Since the number of electronic control units included in the conventional vehicle system is limited, each electronic control unit is connected by a point-to-point wiring connection method. However, such a point-to-point wiring connection method may rapidly increase the complexity, cost, and weight of the connection, as the number of electronic control units increases. Since CAN communication uses a serial bus network method, communication between various electronic control units is easy.

CAN communication is designed so that electronic control units communicate with each other through a CAN bus without a host. For this, an electronic control unit may include a CAN controller connected to the CAN bus. The CAN controller controls the communication between the electronic control unit and the CAN bus. The vehicle system requires rapid data communication in order to secure the safety of the occupant. Therefore, there is a demand for a CAN controller capable of minimizing the delay of data communication and securing the speed of CAN communication.

CAN 2.0 A and CAN 2.0 B are used as protocols for CAN communication. In addition, recently, CAN 2.0 A FD and CAN 2.0 B FD are additionally developed. The structures of the data frames of CAN 2.0 A, CAN 2.0 B, CAN 2.0 FD, and CAN 2.0 B FD are different. Thus, there is a need for a CAN controller that may be easily configured to match the type of this protocol.

SUMMARY

The present disclosure provides a CAN controller capable of supporting all of CAN 2.0 A, CAN 2.0 B, CAN 2.0 A FD, and CAN 2.0 B FD, and capable of securing the speed of CAN communication, and a data transmission method using the CAN controller.

An embodiment of the inventive concept provides controller Area Network (CAN) controller including: a receiver configured to analyze reception information received from a CAN bus according to a set protocol; a reception First in First out (FIFO) memory configured to store the reception information to be overwritten on previously stored reception information based on identification data of the reception information and a bus load of the CAN bus; an interface configured to provide the reception information stored in the reception FIFO memory to a processor and receive transmission information from the processor; a transmission FIFO memory configured to store the transmission information to be overwritten on previously stored transmission information based on identification data of the transmission information and a processor load of the processor; and a transmitter configured to set the protocol and transmit the transmission information stored in the transmission FIFO memory to the CAN bus.

In an embodiment, the transmitter may select target bit states of a data frame corresponding to the protocol among a plurality of bit states to set the protocol.

In an embodiment, the protocol generator may sequentially transition each of the target bit states to determine a data frame of the transmission information.

In an embodiment, the protocol generator may select one of a CAN 2.0 A protocol, a CAN 2.0 B protocol, a CAN 2.0 A FD protocol, and a CAN 2.0 B FD protocol and select the target bit states based on the selected protocol.

In an embodiment, the receiver may include a protocol analyzer for sequentially transitioning the target bit states to analyze the reception information.

In an embodiment, the receiver may include: a masking filter register configured to determine whether to provide the reception information to the reception FIFO memory based on the identification data of the reception information; a baud-rate adjuster configured to adjust a baud-rate of a data frame of the reception information according to the set protocol; and an error detector configured to detect an error of the reception information to determine whether to provide the reception information to the reception FIFO memory.

In an embodiment, the CAN controller may further include an identification data scanner configured to overwrite the reception information on a memory block of the reception FIFO memory where information having the same identification data as the identification data of the reception information is stored, when the bus load is higher than the processor load.

In an embodiment, the CAN controller may further include: a bus load detector configured to detect the bus load to provide bus load information to the identification data scanner; and a processor load detector configured to detect the processor load to provide processor load information to the identification data scanner.

In an embodiment, the CAN controller may further include an identification data scanner configured to overwrite the transmission information on a memory block of the transmission FIFO memory where information having the same identification data as the identification data of the transmission is stored, when the processor load is higher than the bus load.

In an embodiment of the inventive concept, a data transmission method of a controller Area Network (CAN) controller includes: receiving, by the CAN controller, data information; detecting, by the CAN controller, an amount of data information expected to be received; searching for, by the CAN controller, a memory block of a First in First out (FIFO) memory where information having the same identification data as the identification data of the data information is stored; and overwriting, by the CAN controller, the data information on the memory block based on the amount of data information expected to be received.

In an embodiment, the data information may be transmission information provided from a processor, wherein the detecting of the amount of data information may include detecting, by the CAN controller, a processor load of the processor.

In an embodiment, the method may further include sequentially outputting, by the CAN controller, information stored in the FIFO memory to a CAN bus.

In an embodiment, the detecting of the amount of data information may further include comparing, by the CAN controller, the processor load with a bus load of a CAN bus, wherein the overwriting of the data information may include overwriting the transmission information when the processor load is greater than the bus load.

In an embodiment, the overwriting of the data information may include overwriting the transmission information when the processor load is greater than a reference load value.

In an embodiment, the data information may be reception information provided from a CAN bus, wherein the detecting of the amount of data information may include detecting, by the CAN controller, a bus load of the CAN bus.

In an embodiment, the method may further include sequentially outputting, by the CAN controller, information stored in the FIFO memory to a processor.

In an embodiment, the detecting of the amount of data information may further include comparing, by the CAN controller, a load of a processor with the bus load, wherein the overwriting of the data information may include overwriting the reception information when the bus load is greater than the processor load.

In an embodiment, the overwriting of the data information may include overwriting the reception information when the bus load is greater than a reference load value.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 10 is a flowchart illustrating a method of transmitting transmission information according to an embodiment of the inventive concept.

DETAILED DESCRIPTION

In the following, embodiments of the inventive concept will be described in detail so that those skilled in the art easily carry out the inventive concept. In the following, a Controller Area Network (CAN) controller for CAN communication delivers transmission information or reception information. The transmission information and the reception information may be formally changed by various causes such as the protocol setting, baud-rate adjustment, bit stuffing, or clock synchronization of the CAN controller. If the meaning of the data included in each of the transmission information and the reception information is maintained, it is referred to as transmission information and reception information without changing the term, even if the format of the transmission information and the reception information change partially, from the viewpoint of efficiency or error minimization of data communication.

Figure 1:
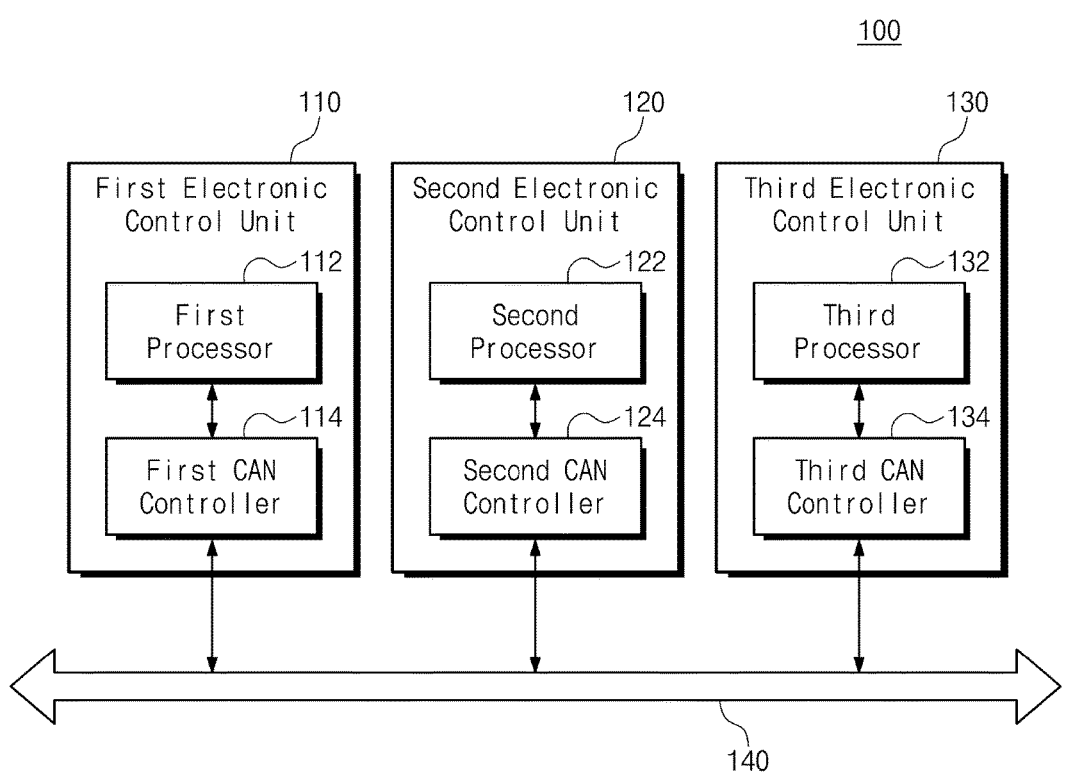
FIG. 1 is a block diagram of a CNN system according to an embodiment of the inventive concept.

FIG. 1 is a block diagram of a CNN system according to an embodiment of the inventive concept. A CAN system 100 may be a system that communicates by any of the CAN 2.0 A, CAN 2.0 B, CAN 2.0 A FD, and CAN 2.0 B FD protocols described below. Referring to FIG. 1, the CAN system 100 may include first to third electronic control units 110 to 130 and a CAN bus 140. Although three electronic control units are illustrated as an example, the number of electronic control units is not limited. The CAN system 100 may be applied to various fields using the CAN protocol. For example, the CAN system 100 may be a vehicle system.

The first electronic control unit 110 includes a first processor 112 and a first CAN controller 114. The second electronic control unit 120 includes a second processor 122 and a second CAN controller 124. The third electronic control unit 130 includes a third processor 132 and a third CAN controller 134. Each of the first to third electronic control units 110 to 130 is connected to the CAN bus 140 to perform communication. For example, when the CAN system 100 is a vehicle system, each of the first to third electronic control units 110 to 130 may be a device for electronically controlling various vehicle devices such as an engine, a handle, and a brake.

The first to third processors 112 to 132 may perform a function of a Central Processing Unit (CPU) for the corresponding electronic control unit. For example, when the first electronic control unit 110 is an ECU for controlling the engine, the first processor 112 may perform the control operation and the arithmetic operation required to control the engine. The first processor 112 may provide information generated by these control operation and arithmetic operation to the first CAN controller 114 as a transmission signal. In addition, the first processor 112 may receive information generated by the second processor 122 or the third processor 132 from the first CAN controller 114. Thus, the electronic control unit may interact with other electronic control units, and through this interaction, complex functions such as autonomous driving may be performed.

The first to third CAN controllers 114 to 134 control transmission/reception of information to/from the corresponding electronic control unit. Each of the first to third CAN controllers 114 to 134 provides the CAN bus 140 with information including identification data. Each of the first to third CAN controllers 114 to 134 analyzes the identification data of the information provided on the CAN bus 140 to determine whether to receive the information. The identification data may represent an attribute of the corresponding information, and each of the first to third CAN controllers 114 to 134 may determine whether the information is necessary for driving the corresponding electronic control unit.

Each of the first to third CAN controllers 114 to 134 may integrally support various CAN protocols. In addition, each of the first to third CAN controllers 114 to 134 may detect a load of a corresponding one of the first to third processors 112 to 132 or a load of the CAN bus 140 to overwrite recent transmission information or reception information. Therefore, the efficiency of the CAN system 100 is ensured, and the transmission delay of the information by the load is prevented, so that the stability may be secured. Specific contents of overwriting the transmission information or reception information will be described later.

The CAN bus 140 may provide a communication path between the first to third electronic control units 110 to 130 of the CAN system 100. The first to third electronic control units 110 to 130 may exchange information with each other through the CAN bus 140. In the case of using the CAN bus 140, since information is exchanged without directly connecting each of the electronic control units, efficiency may be secured in terms of the complexity, cost, and weight of the connection between the electronic control units.

Figure 2:
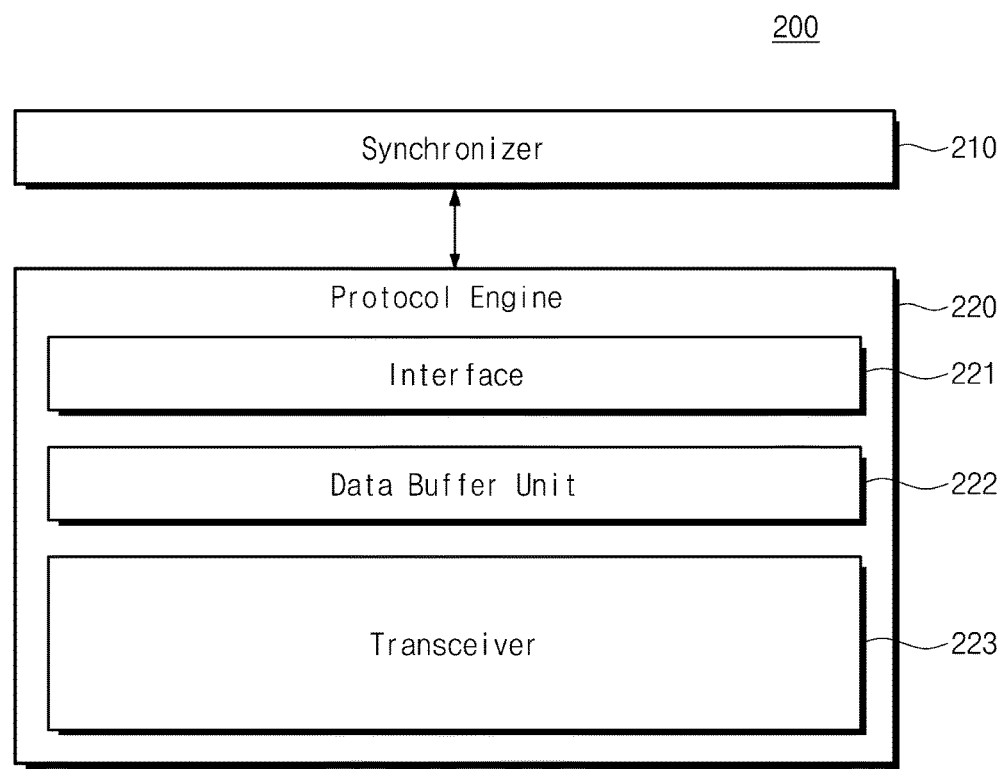
FIG. 2 is a block diagram of a CAN controller included in FIG. 1.

FIG. 2 is a block diagram of the CAN controller included in FIG. 1. For convenience of explanation, referring to the reference numerals of FIG. 1, the configurations of FIG. 2 will be described. The CAN controller 200 may be viewed as the first to third CAN controllers 114 to 134 of FIG. 1. Hereinafter, the CAN bus will be described with reference to the reference numeral of the CAN bus 140 in FIG. 1, and the following processor will be described with reference to the reference numeral of the first processor 112 in FIG. 1.

Referring to FIG. 2, the CAN controller 200 includes a synchronizer 210 and a protocol engine 220. The protocol engine 220 includes an interface 221, a data buffer unit 222, and a transceiver 223. The CAN controller 200 may be included in the first to third electronic control units 110 to 130. The CAN controller 200 may receive data information from the processor 112 and output the data information to the CAN bus 140. Alternatively, the CAN controller 200 may receive the data information from the CAN bus 140 and output the data information to the processor 112.

The synchronizer 210 may be connected to the processor 112 to perform data communication. The synchronizer 210 may be connected to the processor 112 through a peripheral device bus. For example, the peripheral device bus may be an Advanced Peripheral Bus (APB). The clock frequency and phase of the peripheral device bus may be different from the clock frequency and phase of the CAN controller 200. In this case, Clock Domain Crossing (CDC) may be generated. The synchronizer 210 may synchronize the clock of the peripheral device bus with the clock of the CAN controller 200.

The protocol engine 220 controls data communication between the processor 112 and the CAN bus 140. For this, the protocol engine 220 may generate a protocol for data communication with the CAN bus 140. The protocol engine 220 may receive the transmission information of the processor 112 provided through the synchronizer 210. The protocol engine 220 may transmit the transmission information to the CAN bus 140. The transmission information provided to the CAN bus 140 may be provided to a CAN controller included in another electronic control unit. The protocol engine 220 may receive the reception information provided through the CAN bus 140. The protocol engine 220 may transmit the reception information to the synchronizer 210. The synchronizer 210 may provide the reception information to the processor 112.

The interface 221 may be implemented with a circuit that performs data communication between the protocol engine 220 and the processor 112. The interface 221 may provide the transmission information received from the synchronizer 210 to the data buffer unit 222. The interface 221 may receive the reception signal from the data buffer unit 222 and provide it to the synchronizer 210. The reception signal may be provided to a peripheral device bus through the synchronizer 210 and provided to the processor 112.

The data buffer unit 222 may store transmission information provided from the transceiver 223. The data buffer unit 222 may sequentially store the transmission information over time, and may provide the transmission information to the interface 221 in the stored order. For this, the data buffer unit 222 may include a First in First out (FIFO) memory. In addition, the data buffer unit 222 may store the reception information provided from the interface 221. The data buffer unit 222 may sequentially store the reception information over time, and may provide the reception information to the transceiver 221 in the stored order. For this, the data buffer unit 222 may include a FIFO memory.

The data buffer unit 222 may output data in the order in which data is inputted in a normal state. However, when the amount of data to be processed by the processor 112 is large or the amount of data provided to the CAN bus 140 is large, it may take time for the data buffer unit 222 to output all the data. Especially, in the vehicle system where CAN communication method is frequently used, the delay of data output may be directly related to the safety of the passenger. In addition, it is inefficient to delay data output in order to output all data due to the characteristics of the vehicle system in which the surrounding situation changes rapidly in real time and the latest data is more important than the previous data. Therefore, when the amount of data information to be provided to the data buffer unit 222 is large, new data information may be overwritten on already stored data information. Details of this will be described later.

The transceiver 223 receives the transmission information from the data buffer unit 222 and transmits it to the CAN bus 140. The transceiver 223 receives the reception information from the CAN bus 140 and transmits it to the data buffer unit 222. The transceiver 223 may preset the protocol. The transceiver 223 may transmit the transmission information to the CAN bus 140 and receive the reception information from the CAN bus 140 according to the set protocol. The protocol may be either CAN 2.0 A, CAN 2.0 B, CAN 2.0 A FD, or CAN 2.0 B FD. The transceiver 223 may support all of CAN 2.0 A, CAN 2.0 B, CAN 2.0 A FD, and CAN 2.0 B FD, and select the protocol determined by the vehicle system. Details of this will be described later.

Figure 3:
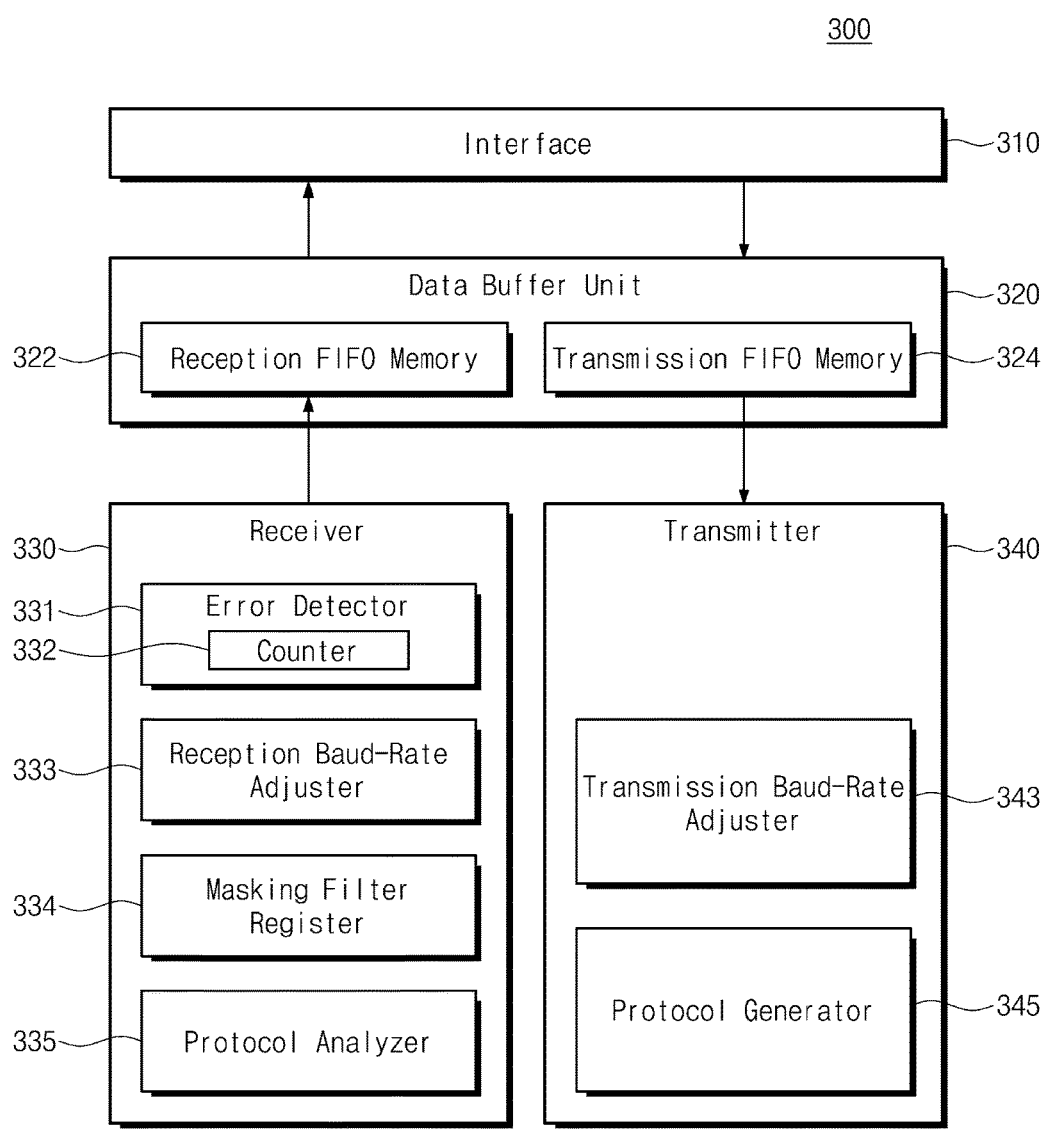
FIG. 3 is a specified block diagram of a protocol engine of FIG. 2.

FIG. 3 is a specified block diagram of the protocol engine of FIG. 2. Referring to FIG. 3, a protocol engine 300 includes an interface 310, a data buffer unit 320, a receiver 330, and a transmitter 340. The interface 310 of FIG. 3 is substantially the same as the interface 221 of FIG. 2 and thus, a detailed description is omitted. The data buffer unit 320 of FIG. 3 corresponds to the data buffer unit 222 of FIG. 2. The receiver 330 and the transmitter 340 of FIG. 3 may be seen in the configuration they are included in the transceiver 223 of FIG. 2.

The data buffer unit 320 includes a reception FIFO memory 322 and a transmission FIFO memory 324. The reception FIFO memory 322 and the transmission FIFO memory 324 store the data information in the received order and output the data information in the stored order in principle. The reception FIFO memory 322 stores reception information in the order in which the reception information is received from the receiver 330. The reception FIFO memory 322 outputs reception information to the interface 310 in the stored order. The transmission FIFO memory 324 stores transmission information in the order in which the transmission information is received from the interface 310. The transmission FIFO memory 324 outputs transmission information to the transmitter 340 in the stored order. The reception FIFO memory 322 and the transmission FIFO memory 324 may be implemented with the same kind of memory.

The reception FIFO memory 322 may store the reception information instead the previously stored information according to the bus load of the CAN bus 140. The bus load is determined by the amount of data provided to the CAN bus 140. If the amount of data provided to the CAN bus is large, the bus load increases. If the bus load is large, the reception information to be stored in the reception FIFO memory 322 may increase. In this case, the newly received reception information may be overwritten on the reception information having the same attribute. At this time, the reception information stored in the reception FIFO memory 322 may be outputted to the interface 310 in the output order of the reception information deleted by overwriting.

The transmission FIFO memory 324 may store transmission information instead of previously stored information according to the processor load of the processor 112. The processor load is determined by the amount of data processed by the processor 112. If the amount of data processed by the processor 112 is large, the processor load increases. If the processor load is large, the transmission information to be stored in the transmission FIFO memory 324 may increase. In this case, the newly received transmission information may be overwritten on the transmission information having the same attribute. At this time, the transmission information stored in the transmission FIFO memory 324 may be outputted to the interface 340 in the output order of the transmission information deleted by overwriting.

The receiver 330 may receive reception information from the CAN bus 140. The receiver 330 may provide reception information to the data buffer unit 320. The reception information provided to the data buffer unit 320 may be stored in the reception FIFO memory 322. The receiver 330 includes an error detector 331, a reception baud-rate adjuster 333, a masking filter register 334, and a protocol analyzer 335. The error detector 331 includes a counter 332.

The error detector 331 detects an error in reception information. For example, the error detector 331 may detect bit errors, Stuff errors, form errors, cyclic redundancy check (CRC) errors, and acknowledgment bit errors. Bit errors occur when information transmitted from one node is not represented on the CAN bus. Stuff errors occur when six consecutive bit values in the CAN protocol must not appear in principle. Form errors occur when the bit value specified by 0 or 1 appears differently. CRC errors occur when CRC calculation of a CRC field of the reception information confirms that some bits are changed. Acknowledgment bit errors occur when the receiver 330 receives reception information without error and the acknowledgment bit with a bit value of 0 has a different value. The counter 332 may count the number of errors detected by the error detector 331. If the number of detected errors is greater than or equal to a specific number, the error detector 331 may control the receiver 330 not to receive reception information and provide it to the reception FIFO memory 322.

The reception baud-rate adjustor 333 adjusts the baud-rate of the reception information. The reception baud-rate adjustor 333 adjusts the baud rate of the data field included in the reception information according to the set protocol. For example, the reception baud-rate adjustor 333 may adjust the clock so that the data field is transmitted at a maximum of 1 Mbps when the protocol is set to CAN 2.0 A or CAN 2.0 B. The reception baud-rate adjustor 333 may adjust the clock so that the data field is transmitted at a maximum of 8 Mbps when the protocol is set to CAN 2.0 A FD or CAN 2.0 B FD. The reception baud-rate adjustor 333 may not adjust the baud rate of other fields except the data field regardless of the set protocol. For example, the reception baud-rate adjustor 333 may maintain the baud-rate of an arbitration field, a control field, a CRC field, and an acknowledgement field, which will be described later, at 1 Mbps. In addition, the reception baud-rate adjuster 333 may additionally change the sampling position of the reception information.

The masking filter register 334 may filter the reception information based on the identification data of the reception information. The identification data may be provided to the arbitration field included in the data frame of the reception information. The masking filter register 334 may set identification data of reception information that the receiver 330 is to receive and provide to the reception FIFO memory 322. For example, if the identification data of the reception information matches the value of the set identification data, the receiver 330 may provide the reception information to the reception FIFO memory 322. For example, if the identification data of the reception information is different from the value of the set identification data, the receiver 330 may not provide the reception information to the reception FIFO memory 322. On the other hand, the masking filter register 334 may set identification data of reception information that is not to be provided to the reception FIFO memory 322.

The protocol analyzer 335 is connected to the CAN bus 140 to receive reception information. The protocol analyzer 335 analyzes the reception information according to the set protocol. The protocol analyzer 335 may sequentially analyze the data frame of the reception information according to the structure of the data frame by the set protocol. The structures of the bits included in the data frame of each of the CAN 2.0 A, CAN 2.0 B, CAN 2.0 FD, and CAN 2.0 B FD protocols are different. Therefore, the state transition for analysis of reception information may be different according to a set protocol. A specific example of such a state transition will be described later.

Based on the reception information analyzed by the protocol analyzer 335, the error detector 331 may recognize the position of a bit required for error detection and detect an error. Based on the analyzed reception information, the reception baud-rate adjuster 333 may recognize the position of the data field and adjust the baud-rate of the data field according to the set protocol. Based on the analyzed reception information, the masking filter register 334 may recognize the position of the arbitration field and the identification data, and determine whether to provide reception information.

The protocol analyzer 335 may remove the stuff bits of the data frame in the reception information. As described above, six consecutive bit values may not appear in the CAN protocol. For this, the reception information provided to the receiver 330 includes a stuff bit having a bit value at the sixth bit, which is opposite to the consecutive bit value, when five consecutive bit values appear. The protocol analyzer 335 may remove such stuff bits. Also, the protocol analyzer 335 may adjust the reception information so that the acknowledgment bit has a value of 1 changed from 0 when reception information is received without error.

The transmitter 340 may receive the transmission information from the data buffer unit 320. The transmitter 340 may provide the transmission information to the CAN bus 140. The transmitter 340 includes a transmission baud-rate adjuster 343 and a protocol generator 345. The transmission baud-rate adjuster 343 adjusts the baud-rate of the data field included in the transmission information, similar to the reception baud-rate adjuster 333 included in the receiver 330. That is, the transmission baud-rate adjustor 343 may adjust the clock so that the data field is transmitted at a maximum of 1 Mbps when the protocol is set to CAN 2.0 A or CAN 2.0 B. The transmission baud-rate adjustor 343 may adjust the clock so that the data field is transmitted at a maximum of 8 Mbps when the protocol is set to CAN 2.0 A FD or CAN 2.0 B FD.

The protocol generator 345 is connected to the CAN bus 140 to transmit the transmission information. The protocol generator 345 sets the protocol. The protocol generator 345 may integrally support CAN 2.0 A, CAN 2.0 B, CAN 2.0 A FD, and CAN 2.0 B FD protocols. The protocol generator 345 may select a protocol to match the type of a protocol for the corresponding vehicle system. For example, if the system including the corresponding CAN controller supports the CAN 2.0 A protocol, the protocol generator 345 may set the protocol to have a data frame corresponding to CAN 2.0 A.

The protocol generator 345 may determine each of the bits of the transmission information according to the set protocol. In order to determine the bits of such transmission information, the protocol generator 345 may determine all bit states of the data frames included in the CAN 2.0 A, CAN 2.0 B, CAN 2.0 A FD, and CAN 2.0 B FD protocols. The protocol generator 345 may select the target bit state according to the set protocol among all the bit states. The protocol generator 345 may sequentially transition the selected target bit states to determine the data frame of the transmission information. Table 1 shows the state transitions of these data frames.

TABLE 1

| Field | Bit state | CAN 2.0 A | CAN 2.0 B | CAN 2.0 A FD | CAN 2.0 B FD |
|---|---|---|---|---|---|
| SOF | SOF | ○ | ○ | ○ | ○ |
| Arbitration field | ID1 | ○ | ○ | ○ | ○ |
|  | SRR | X | ○ | X | ○ |
|  | IDE | X | ○ | X | ○ |
|  | ID2 | X | ○ | X | ○ |
|  | RTR | ○ | ○ | X | X |
|  | R1 | X | X | ○ | ○ |
| Control field | IDE | ○ | X | ○ | X |
|  | R1 | X | ○ | X | X |
|  | EDL | X | X | ○ | ○ |
|  | R0 | ○ | ○ | ○ | ○ |
|  | BRS | X | X | ○ | ○ |
|  | ESI | X | X | ○ | ○ |
|  | DLC | ○ | ○ | ○ | ○ |
| Data field | DATA | ○ | ○ | ○ | ○ |
| CRC field | SC | X | X | ○ | ○ |
|  | CRC | ○ | ○ | ○ | ○ |
|  | CRC_D | ○ | ○ | ○ | ○ |
| Acknowledgement field | ACK | ○ | ○ | ○ | ○ |
|  | ACK_D | ○ | ○ | ○ | ○ |
| EOF | EOF | ○ | ○ | ○ | ○ |

Referring to Table 1, a data frame includes a start of frame, an arbitration field, a control field, a data field, a CRC field, an acknowledgment field, and an end of frame. The arbitration field includes at least one of a first identification data ID1, a Substitute Remote Request (SRR) bit, an Identifier extension (IDE) bit, a second identification data ID2, a Remote Transmission Request (RTR) bit, and an arbitration field reserved bit R1. The control field includes at least one of an IDE bit, a first control field reserved bit R1, an Extended Data Length (EDL) bit, a second control field reserved bit R0, a Bit Rate Switch (BRS) bit, an Error State Indicator (ESI), and a Data Length Code (DLC) bit. The CRC field may include at least one of an SC bit, a CRC bit, and a CRC delimiter bit CRC_D. The acknowledgment field may include an acknowledgment bit ACK and an acknowledgment delimiter bit ACK_D.

The data frame of each of the CAN 2.0 A, CAN 2.0 B, CAN 2.0 A FD, and CAN 2.0 B FD protocols includes bits corresponding to the bit states indicated by 'O', and does not include bits corresponding to the bit states indicated by 'X'. The protocol generator 245 successively transitions target bit states, which are bit states indicated by 'O' in the set protocol, to determine a data frame of transmission information. For example, when the CAN 2.0 A protocol is set, the protocol generator 245 sequentially perform state transition with the start of frame (SOF), the first identification data ID1, the RTR bit, the IDE bit, the second control field reserved bit R0, and DLC bit to determine a data frame. At this time, the protocol generator 245 may determine the data frame by selecting the first identification data ID1, skipping the SRR bit, the IDE bit of the arbitration field, and the second identification data, and state-transitioning to the RTR bit. A description of the bits corresponding to each bit state will be described later.

The protocol generator 345 may use a dedicated circuit such as an Application Specific Integrated Circuit (ASIC) to implement the state transition shown in Table 1. For example, a plurality of decision circuits for determining respective bit states may be connected in series, and according to a set protocol, a decision circuit corresponding to a bit state indicated by '0' may be implemented to be passed and a decision circuit corresponding to a bit state indicated by 'X' may be implemented to be bypassed. In addition, the protocol generator 345 may be implemented with software or firmware to be programmed to determine and analyze data frames by sequentially transitioning the target bit states indicated by '0'. The protocol analyzer 335 may also be implemented with a dedicated circuit, software or firmware to analyze data frames in the same manner.

When the protocol generator 345 transmits the transmission information to the CAN bus 140, another transmitter may simultaneously transmit transmission information to the CAN bus 140. In this case, the protocol generator 345 may arbitrate to allow a transmitter having a high priority to first transmit the transmission information to the CAN bus 140. The priority may be determined based on the identification data of the transmission information. The protocol generator 345 may additionally add stuff bits. If five consecutive bit values appear in the CAN protocol, the protocol generator 345 may add a stuff bit having a bit value opposite to the consecutive bit value to the sixth bit.

Reception information or transmission information according to the CAN protocol may include a remote frame, an error frame, and an overload frame in addition to the data frame described above. The remote frame may be used by the receiver 330 to request information transmission from the transmitter of another node. The error frame may be used to notify other nodes of a detected error when an error is detected in the received information. The overload frame may be used when the receiver 330 is not ready for receiving information. Data frames of each of the CAN 2.0 A, CAN 2.0 B, CAN 2.0 A FD, and CAN 2.0 B FD protocols may have different bit structures, but the remote frame, the error frame, and the overload frame may have the same bit structure. Accordingly, the protocol generator 345 may determine the data frame by selecting the target bit states only for the data frame.

Figure 4:
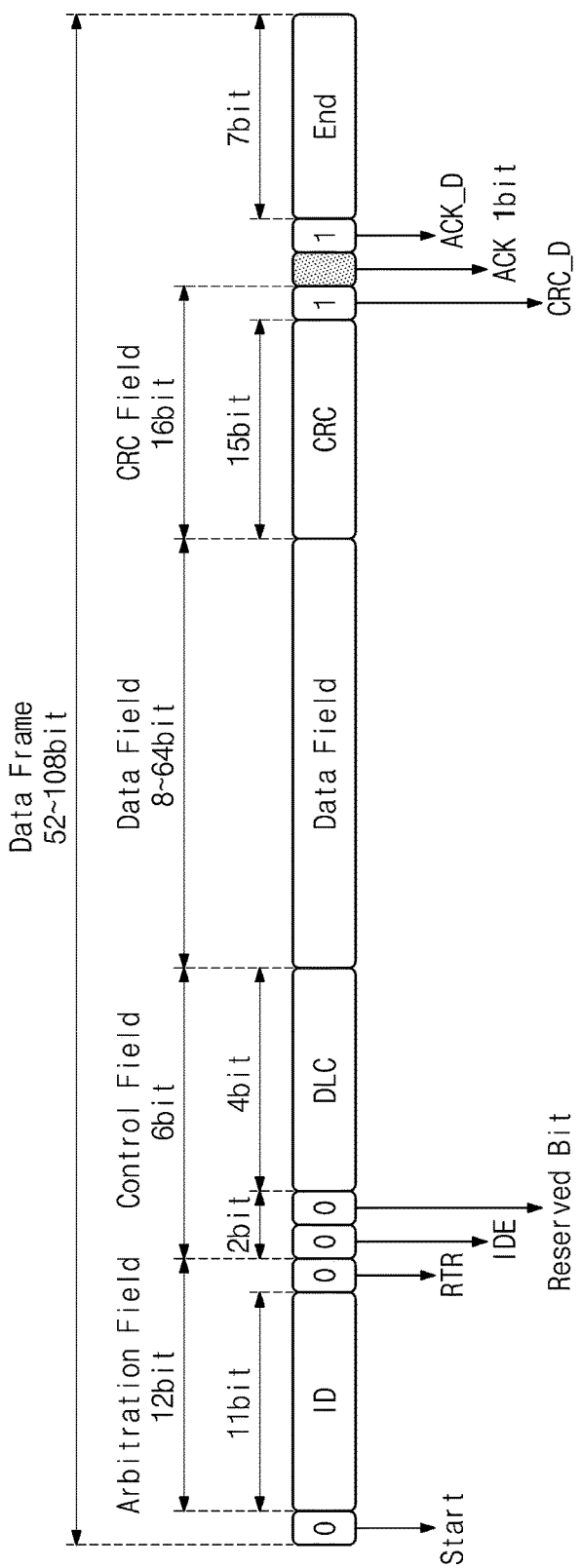
FIG. 4 is a view illustrating the structure of a data frame for a CAN 2.0 A protocol.

FIG. 4 is a view illustrating the structure of a data frame for the CAN 2.0 A protocol. Referring to FIG. 4, a data frame for the CAN 2.0 A protocol is divided into a start of frame (Start), an arbitration field, a control field, a data field, a CRC field, an acknowledgment field, and an end of frame (End). The data frame may have a length of 52 bits or more and 108 bits or less.

The arbitration field may include 11-bit identification data ID and 1-bit RTR bit. The identification data ID may indicate the attribute of the data frame. The priority of the data frame may be determined based on the identification data ID. The RTR bit is used to determine the data frame and the remote frame, and may have a bit value of 0 in the data frame.

The control field may include a 1-bit IDE bit, a 1-bit reserved bit, and a 4-bit DLC bit. The IDE bit may be used to indicate a CAN 2.0 A protocol with 11-bit identification data ID, and may have a bit value of 0. The DLC bit may be used to indicate the length of the data field. In the CAN 2.0 A protocol, the data field may have a length of 8 bits or more and 64 bits or less. Also, as described above, in the CAN 2.0 A protocol, the data field may be transmitted at a maximum of 1 Mbps.

The CRC field may include a 15-bit CRC bit and a 1-bit CRC delimiter bit. The CRC bits may be used to detect errors through CRC. The CRC delimiter bit may be provided to distinguish the CRC field from the acknowledgment field and may have a bit value of 1. The acknowledgment field may include a 1-bit acknowledgment bit and a 1-bit acknowledgment delimiter bit. The acknowledgment bit may be set to have a bit value of 1 in the transmission information and may be provided to the CAN bus 140. The acknowledgment bit may be set to have a bit value of 0 if reception information is received without error. The acknowledgment delimiter bit may be provided to distinguish the acknowledgment field from the end of frame, and may have a bit value of 1.

Figure 5:
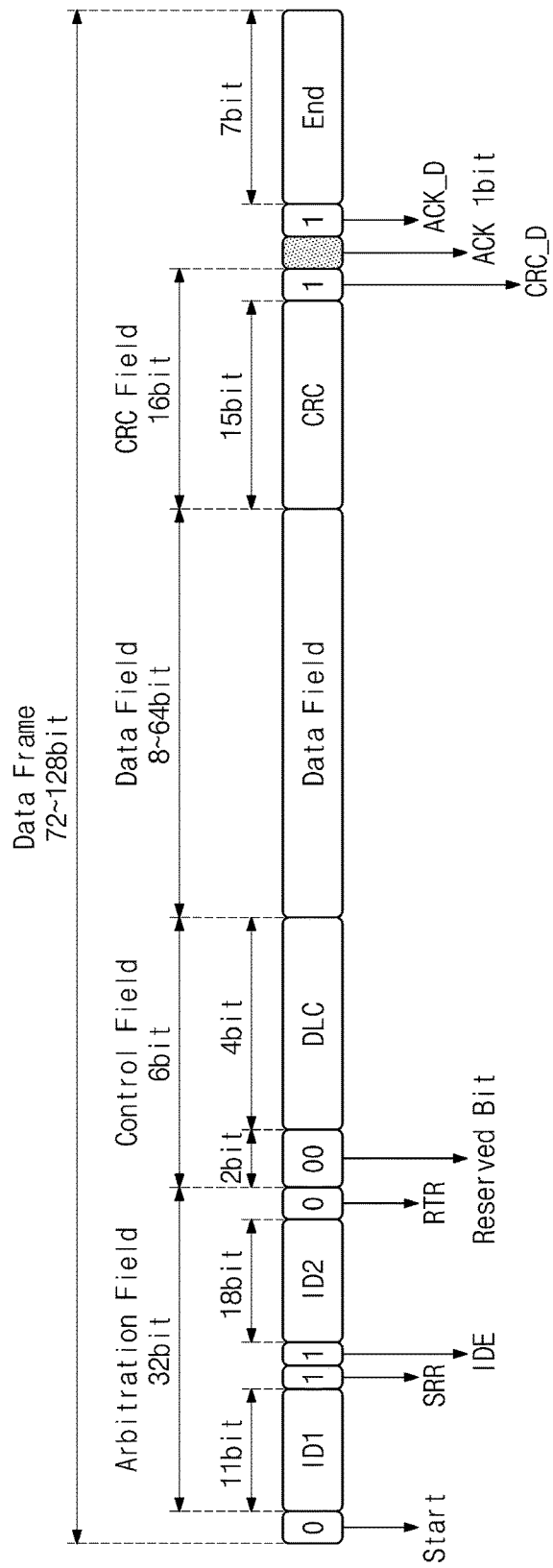
FIG. 5 is a view illustrating the structure of a data frame for a CAN 2.0 B protocol.

FIG. 5 is a view illustrating the structure of a data frame for the CAN 2.0 B protocol. Referring to FIG. 5, a data frame for the CAN 2.0 B protocol is divided into a start of frame (Start), an arbitration field, a control field, a data field, a CRC field, an acknowledgment field, and an end of frame (End). The data frame may have a length of 72 bits or more and 128 bits or less.

The arbitration field may include 11-bit first identification data ID1, 1-bit SRR bit, 1-bit IDE bit, 18-bit second identification data ID2, and 1-bit RTR bit. The first identification data ID1 and the RTR bit perform the same function as the identification data ID and the RTR bit in FIG. 3. The SRR bit and the IDE bit may be provided for distinction from the CAN 2.0 A protocol and may have a bit value of 1. The protocol generator 345 or the protocol analyzer 335 of FIG. 2 may recognize the presence of the second identification data ID2 by analyzing the SRR bit and the IDE bit. The CAN 2.0 B protocol may represent more diverse attributes and priorities of the data frame because the second identification data ID2 is provided.

The control field may include a 2-bit reserved bit and a 4-bit DCL bit. The DLC bit may be used to indicate the length of the data field. In the CAN 2.0 B protocol, the data field may have a length of 8 bits or more and 64 bits or less. Also, as described above, in the CAN 2.0 B protocol, the data field may be transmitted at a maximum of 1 Mbps. The CRC field may include a 15-bit CRC bit and a 1-bit CRC delimiter bit, as in the CAN 2.0 A protocol of FIG. 4. The acknowledgment field may include a 1-bit acknowledgment bit and a 1-bit acknowledgment delimiter bit, as in the CAN 2.0 A protocol of FIG. 4.

Figure 6:
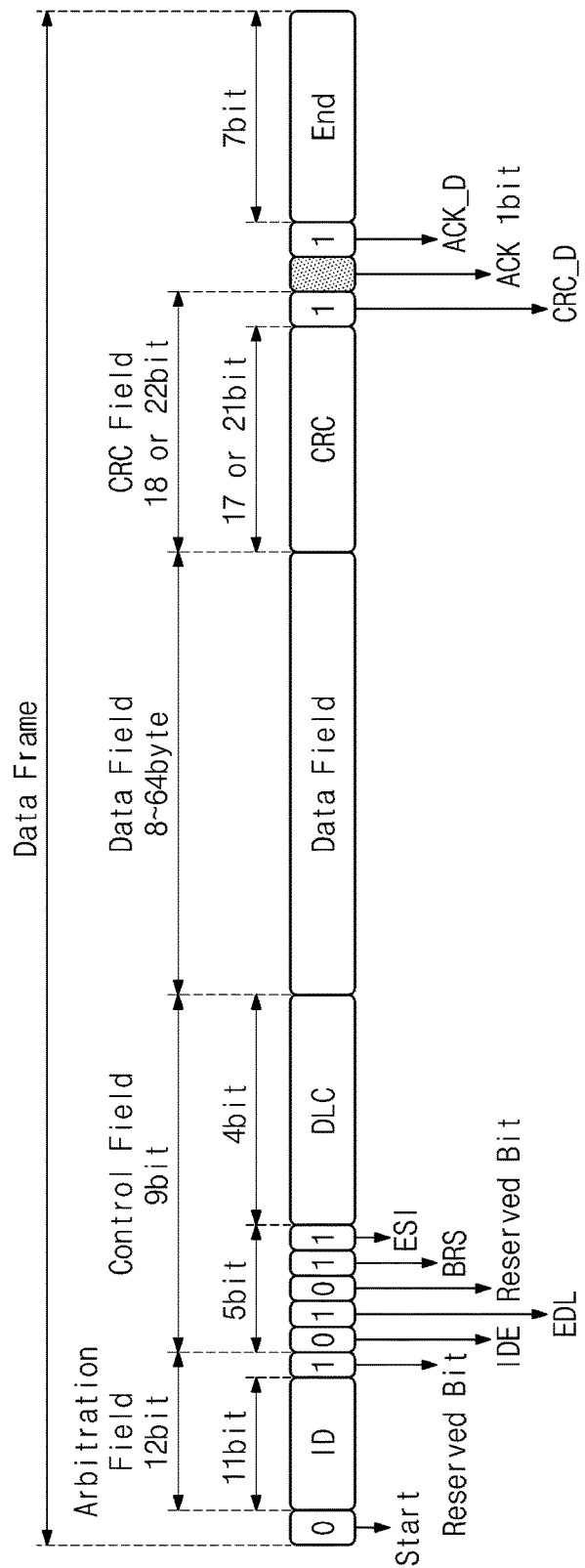
FIG. 6 is a view illustrating the structure of a data frame for a CAN 2.0 A FD protocol.

FIG. 6 is a view illustrating the structure of a data frame for the CAN 2.0 A FD protocol. Referring to FIG. 6, a data frame for the CAN 2.0 A FD protocol is divided into a start of frame (Start), an arbitration field, a control field, a data field, a CRC field, an acknowledgment field, and an end of frame (End). The arbitration field may include 11-bit identification data ID and 1-bit RTR bit as in the CAN 2.0 A protocol of FIG. 4.

The control field may include a 1-bit IDE bit, a 1-bit EDL bit, a 1-bit reserved bit, a 1-bit BRS bit, a 1-bit ESI bit, and a 4-bit DLC bit. The IDE bit may be used to indicate a CAN 2.0 A based protocol with 11-bit identification data ID, and may have a bit value of 0. The EDL bit may be used to indicate an FD protocol having a length of an extended data field, and may have a bit value of 1 when the data field has a length of 8 bytes or more. The BRS bit may be used to switch to a fast baud-rate when transmitting a data field, and may have a bit value of 1. The ESI bit may be used to identify errors during information transmission in the CAN 2.0 A FD protocol. The DLC field may be used to indicate the length of the data field in bytes. In the CAN 2.0 A FD protocol, the data field may have a length of 8 bits or more and 64 bits or less. As described above, in the CAN 2.0 A FD protocol, the data field may be transmitted at a maximum of 8 Mbps.

The CRC field may include a 17 or 21-bit CRC bit and a 1-bit CRC delimiter bit. Depending on the length of the increased data field compared to the CAN 2.0 A protocol, the length of the CRC bits for CRC calculations also increases. The CRC delimiter bit may be provided to distinguish the CRC field from the acknowledgment field and may have a bit value of 1. Although not shown in the drawing, the CRC field may further include a Stuff Count (SC) bit for reflecting stuff bits in CRC calculation. The acknowledgment field may include a 1-bit acknowledgment bit and a 1-bit acknowledgment delimiter bit, as in the CAN 2.0 A protocol of FIG. 3.

Figure 7:
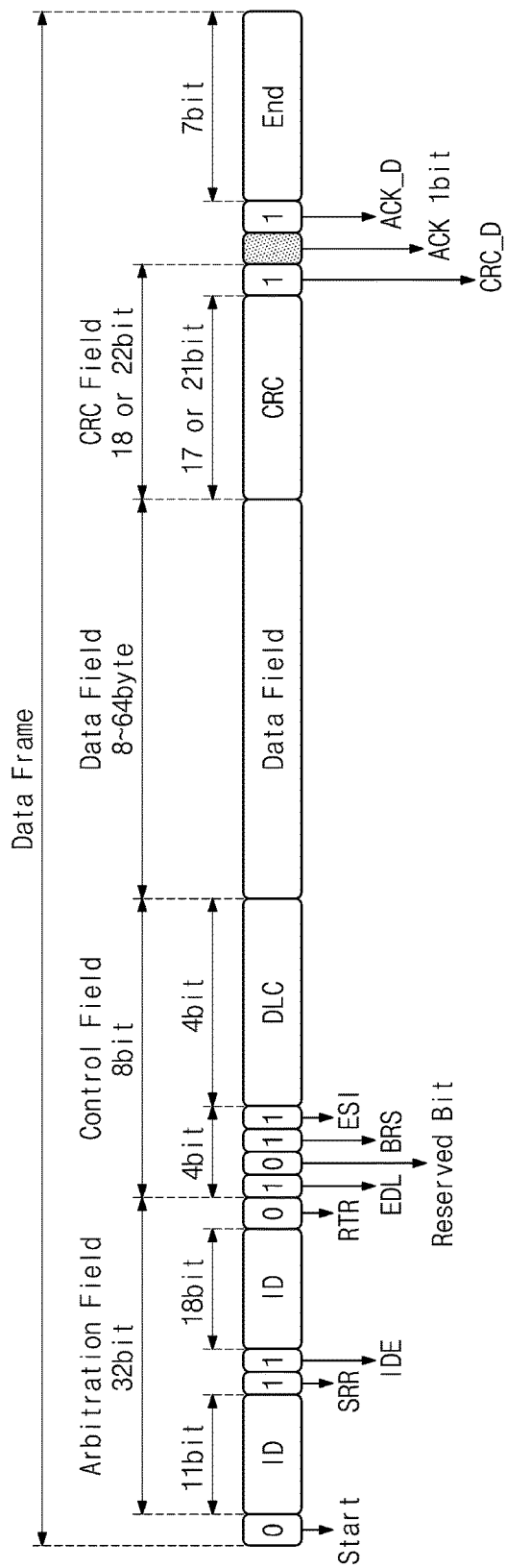
FIG. 7 is a view illustrating the structure of a data frame for a CAN 2.0 B FD protocol.

FIG. 7 is a view illustrating the structure of a data frame for the CAN 2.0 B FD protocol. Referring to FIG. 7, a data frame for the CAN 2.0 B FD protocol is divided into a start of frame (Start), an arbitration field, a control field, a data field, a CRC field, an acknowledgment field, and an end of frame (End). The arbitration field may include 11-bit first identification data ID1, 1-bit SRR bit, 1-bit IDE bit, 18-bit second identification data ID2, and 1-bit RTR bit as in the CAN 2.0 B protocol of FIG. 4.

The control field may include a 1-bit EDL bit, a 1-bit reserved bit, a 1-bit BRS bit, a 1-bit ESI bit, and a 4-bit DLC bit. The functions of the EDL bit, the reserved bit, the BRS bit, the ESI bit, and the DLC bit are the same as the EDL bit, the reserved bit, the BRS bit, the ESI bit, and the DLC bit in the CAN 2.0 A FD protocol of FIG. 6. In the CAN 2.0 B FD protocol, the data field may have a length of 8 bits or more and 64 bits or less. As described above, in the CAN 2.0 B FD protocol, the data field may be transmitted at a maximum of 8 Mbps. The CRC field may include a 17 or 21-bit CRC bit and a 1-bit CRC delimiter bit, as in the CAN 2.0 A FD protocol of FIG. 6. The acknowledgment field may include a 1-bit acknowledgment bit and a 1-bit acknowledgment delimiter bit, as in the protocols of FIGS. 4 to 6.

When putting the descriptions of FIGS. 4 to 7 together, each of CAN 2.0 A, CAN 2.0 B, CAN 2.0 A FD, and CAN 2.0 B FD protocols may have a structure of different data frames. The bit states selected in each protocol may be different. However, as shown in Table 1, the target bit states selected in the CAN 2.0 A, CAN 2.0 B, CAN 2.0 A FD, and CAN 2.0 B FD protocols exist in a total of 21 bit states.

The protocol generator 345 of FIG. 2 may set one of the CAN 2.0 A, CAN 2.0 B, CAN 2.0 A FD, and CAN 2.0 B FD protocols. In this case, the protocol generator 345 and the protocol analyzer 335 may sequentially determine and analyze a data frame by sequentially transitioning target bit states selected in the protocol. Therefore, the CAN controller of the inventive concept may integrally support CAN 2.0 A, CAN 2.0 B, CAN 2.0 A FD, and CAN 2.0 B FD protocols. That is, the use of other CAN controllers is not required to support different protocols, and modules corresponding to the number of protocols supported in the CAN controller are not required.

Figure 8:
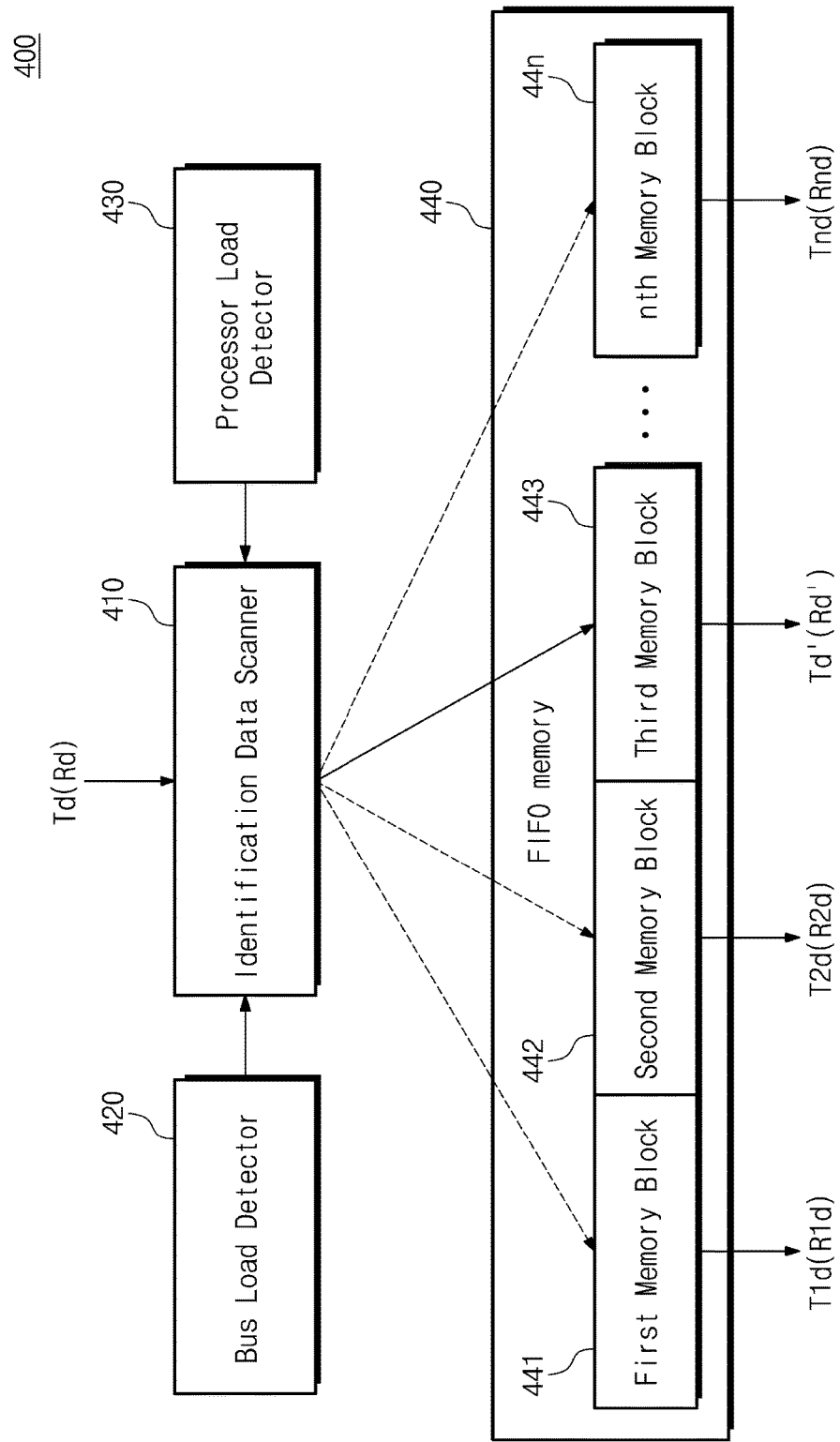
FIG. 8 is a block diagram illustrating a data buffer unit of FIG. 2 or FIG. 3.

FIG. 8 is a block diagram illustrating the data buffer unit of FIG. 2 or FIG. 3. Referring to FIG. 8, the data buffer unit 400 includes an identification data scanner 410, a bus load detector 420, a processor load detector 430, and a FIFO memory 440. The FIFO memory 440 includes a plurality of memory blocks 441 to 44n. The FIFO memory 440 may be seen as the reception FIFO memory 322 of FIG. 3. Alternatively, the FIFO memory 440 may be seen as the transmission FIFO memory 324 of FIG. For convenience of explanation, referring to the reference numerals of FIG. 3, the configurations of FIG. 8 will be described. Alternatively, the CAN bus will be described with reference to the reference numeral of the CAN bus 140 in FIG. 1, and the following processor will be described with reference to the reference numeral of the first processor 112 in FIG. 1.

The data buffer unit 400 may receive the transmission information Td from the interface 310 or receive the reception information Rd from the receiver 330. That is, although the identification data scanner 410, the bus load detector 420, the processor load detector 430, and the FIFO memory 440 are shown as one configuration, the actual data buffer unit 400 may be divided into a configuration of processing the transmission information Td and a configuration of processing the reception information Rd. That is, each of the identification data scanner 410, the bus load detector 420, the processor load detector 430, and the FIFO memory 440 may be configured with two. Alternatively, only the FIFO memory 440 is configured with two, and the identification data scanner 410, the bus load detector 420, and the processor load detector 430 may be configured with one to process both the transmission information and the reception information.

The identification data scanner 410 receives the transmission information Td or the reception information Rd. The identification data scanner 410 scans the identification data of the transmission information Td or the reception information Rd. As described above, the identification data exists in the arbitration field in the data frame of the transmission information Td or the reception information Rd. The identification data scanner 410 may search for a memory block in which information having the same identification data as the scanned identification data is stored. The identification data scanner 410 may overwrite the transmission information Td or the reception information Rd in the retrieved memory block if the output delay of the received transmission information Td or the reception information Rd is expected.

The identification data scanner 410 may overwrite the transmission information Td on the memory block based on the processor load. The identification data scanner 410 may overwrite the transmission information Td on the memory block if the processor load is greater than the reference load. The reference load may be a predetermined value. In this case, the value of the reference load may not change, and the value of the reference load may be determined in consideration of the stability and the new attribute of the system. Alternatively, the reference load may be a processor load. If the processor load is greater than the bus load, the transmission of the transmission information Td to the CAN bus may be delayed. Accordingly, the identification data scanner 410 may overwrite the transmission information Td on the memory block for transmission of the transmission information Td quickly.

The identification data scanner 410 may overwrite the reception information Rd on the memory block based on the bus load. The identification data scanner 410 may overwrite the reception information Rd on the memory block if the bus load is greater than the reference load. The reference load may be a predetermined value. In this case, the value of the reference load may not change, and the value of the reference load may be determined in consideration of the stability and the new attribute of the vehicle system. Alternatively, the reference load may be a processor load. If the bus load is greater than the processor load, the transmission of the reception information Rd to the processor may be delayed. Accordingly, the identification data scanner 410 may overwrite the reception information Rd on the memory block for transmission of the reception information Rd quickly.

The bus load detector 420 senses the bus load of the CAN bus 140. The bus load detector 420 may sense the amount of data provided to the CAN bus 140. The bus load detector 420 may generate bus load information based on the sensed bus load. The bus load detector 420 may provide the bus load information to the identification data scanner 410. The identification data scanner 410 may determine whether to overwrite the reception information Rd or the transmission information Td based on the bus load information.

The processor load detector 430 senses the processor load. The processor load detector 430 may sense the amount of data processed by the processor 112. The processor load detector 430 may generate processor load information based on the sensed processor load. The processor load detector 430 may provide processor load information to the identification data scanner 410. The identification data scanner 410 may determine whether to overwrite the transmission information Td or the reception information Rd based on the processor load information.

The FIFO memory 440 may store the transmission information Td or the reception information Rd provided in the order in which it is received over time. In addition, the FIFO memory 440 may output the transmission information Td or the reception information Rd in the stored order. For example, the first transmission information T1d provided first may be stored in the first memory block 441, and the second transmission information T2d provided next may be stored in the second memory block 442. Thereafter, the transmission information may be sequentially stored in the nth FIFO memory 44n. In this case, the first transmission information T1d, the second transmission information T2d, and the nth transmission information Tnd may be sequentially outputted to the transmitter 340 in principle.

The third memory block 443 may store the third transmission information provided after the second transmission information T2d. However, the identification data scanner 410 may determine that the processor load is greater than the reference load (or bus load) and may overwrite the transmission information Td on the FIFO memory 440. At this time, the identification information of the third transmission information and the transmission information Td may be the same. The identification data indicates an attribute of the transmission information. Since the latest information among the information having the same attribute in the vehicle system is most important, the transmission information Td is stored on the third memory block 443. That is, the third transmission information is deleted.

Transmission information Td' is outputted to the transmitter 340 after second transmission information T2d is outputted. That is, by overwriting the transmission information Td, information inputted later may be outputted more quickly. In this case, the output order of the transmission information to be received next may be pulled one by one. Therefore, even when the processor load is large, the latest transmission information may be outputted to the CAN bus quickly. Likewise, even if the bus load is large, the latest reception information may be outputted to the processor quickly. The transmission process of the transmission information Td described above is also applied to the process of overwriting the reception information Rd on the FIFO memory 440 and outputting it.

Figure 9:
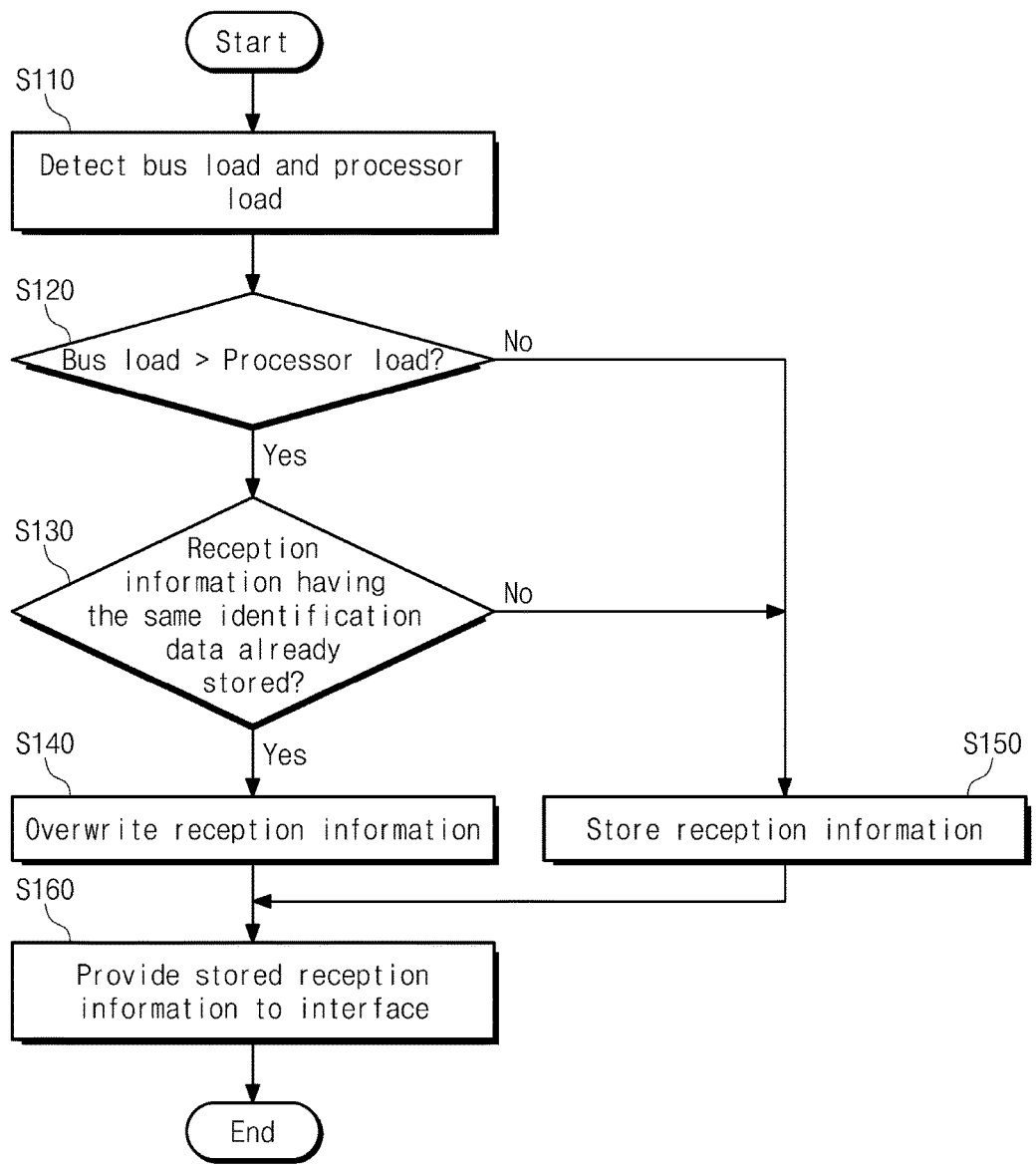
FIG. 9 is a flowchart illustrating a method of transmitting reception information according to an embodiment of the inventive concept.

FIG. 9 is a flowchart illustrating a method of transmitting reception information according to an embodiment of the inventive concept. Operations of FIG. 9 may be performed in the data buffer unit 400 of FIG. 8. For convenience of explanation, referring to the reference numerals of FIG. 8, operations of FIG. 8 will be described.

In operation S110, the data buffer unit 400 detects the bus load and the processor load. The bus load may be sensed by the bus load detector 420. The processor load may be sensed by the processor load detector 430.

In operation S120, the data buffer unit 400 compares the sensed bus load with the sensed processor load. The identification data scanner 410 may receive bus load information from the bus load detector 420 and receive processor load information from the processor load detector 430. The identification data scanner 410 may compare the bus load information and the processor load information to determine load information having a larger value. If the bus load is greater than the processor load, operation S130 is performed. If the bus load is not greater than the processor load, operation S150 is performed. Unlike this, as mentioned with reference to FIG. 8, the identification data scanner 410 may compare the bus load with a predetermined reference load.

In operation S130, the data buffer unit 400 determines whether reception information having the same identification data is already stored. The identification data scanner 410 may analyze the data frame of the reception information Rd to extract the identification data. The identification data scanner 410 may search for reception information having the same identification data as the reception information Rd among the memory blocks of the FIFO memory 440. If the reception information having the same identification data as the reception information Rd is stored on a specific memory block, operation S140 is performed. If the reception information having the same identification data as the reception information Rd is not stored on all the memory blocks of the FIFO memory 440, operation S150 is performed.

In operation S140, the data buffer unit 400 overwrites the reception information Rd on a memory block where reception information having the same identification data is stored. Accordingly, the previously stored reception information is deleted, and the newly provided reception information Rd is stored on the memory block. In operation S150, the FIFO memory 440 stores the reception information Rd. Since operation S150 is the case that the bus load is sufficient, all the reception information may be sufficiently delivered to the processor through a FIFO method. Thus, the reception information Rd is stored on an empty memory block. After operation S140 or operation S150, operation S160 is performed.

In operation S160, the data buffer unit 400 provides the stored reception information Rd to the interface 310. The FIFO memory 440 outputs the reception information Rd to the interface 310 according to the output order of the stored information. In operation S140, when the reception information Rd is overwritten, it is outputted to the interface 310 according to the output order of the deleted reception information. In operation S150, if the reception information Rd is stored on the empty memory block, it may be outputted to the interface 310 after all of the previously stored reception information is outputted. However, if the reception information provided to the data buffer unit 400 is overwritten on the reception information of the previous rank, the overwritten reception information may be outputted to the interface 310 before the reception information Rd.

FIG. 10 is a flowchart illustrating a method of transmitting transmission information according to an embodiment of the inventive concept. Operations of FIG. 10 may be performed in the data buffer unit 400 of FIG. 8. For convenience of explanation, referring to the reference numerals of FIG. 8, operations of FIG. 10 will be described. In operation S210, the data buffer unit 400 detects the bus load and the processor load. The bus load may be sensed by the bus load detector 420. The processor load may be sensed by the processor load detector 430.

In operation S220, the data buffer unit 400 compares the sensed bus load with the sensed processor load. The identification data scanner 410 may receive bus load information from the bus load detector 420 and receive processor load information from the processor load detector 430. The identification data scanner 410 may compare the bus load information and the processor load information to determine load information having a larger value. If the bus load is less than the processor load, operation S230 is performed. If the bus load is not less than the processor load, operation S250 is performed. Unlike this, as mentioned with reference to FIG. 8, the identification data scanner 410 may compare the processor load with a predetermined reference load.

In operation S230, the data buffer unit 400 determines whether transmission information having the same identification data is already stored. The identification data scanner 410 may analyze the data frame of the transmission information Td to extract the identification data. The identification data scanner 410 may search for transmission information having the same identification data as the transmission information Td among the memory blocks of the FIFO memory 440. If the transmission information having the same identification data as the transmission information Td is stored on a specific memory block, operation S240 is performed. If the transmission information having the same identification data as the transmission information Td is not stored on all the memory blocks of the FIFO memory 440, operation S250 is performed.

In operation S240, the data buffer unit 400 overwrites the transmission information Rd on a memory block where transmission information having the same identification data is stored. Accordingly, the previously stored transmission information is deleted, and the newly provided transmission information Td is stored on the memory block. In operation S250, the FIFO memory 440 stores the transmission information Td. Since operation S250 is the case that the processor load is sufficient, all the transmission information may be sufficiently delivered to the CNN bus 140 through a FIFO method. Therefore, the transmission information Td is stored on an empty memory block. After operation S240 or operation S250, operation S260 is performed.

In operation S260, the data buffer unit 400 provides the stored transmission information Td to the transmitter 340. The FIFO memory 440 outputs the transmission information Td to the transmitter 340 according to the output order of the stored information. In operation S240, when the transmission information Td is overwritten, it is outputted to the transmitter 340 according to the output order of the deleted transmission information. In operation S250, if the transmission information Td is stored in the empty memory block, it may be outputted to the transmitter 340 after all of the previously stored transmission information is outputted. However, if the transmission information provided to the data buffer unit 400 is overwritten on the transmission information of the previous rank, the overwritten transmission information may be outputted to the transmitter 340 before the transmission information Td.

A CAN controller and a data transmission method using the same according to an embodiment of the inventive concept may integrally support various CAN protocols by setting the order of state transitions and may overwrite data on a FIFO memory according to a bus load and a processor load to obtain a new attribute of data communication.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A Controller Area Network (CAN) controller comprising:
    a receiver configured to analyze reception information received from a CAN bus according to a set protocol;
    a reception First in First out (FIFO) memory configured to store the reception information to be overwritten on previously stored reception information, before outputting of the previously stored reception information, based on identification data of the reception information and a bus load of the CAN bus;
    an interface configured to provide the reception information stored in the reception FIFO memory to a processor and receive transmission information from the processor;
    a transmission FIFO memory configured to store the transmission information to be overwritten on previously stored transmission information, before outputting of the previously stored transmission information, based on identification data of the transmission information and a processor load of the processor; and
    a transmitter configured to set the protocol and transmit the transmission information stored in the transmission FIFO memory to the CAN bus.

2. The CAN controller of claim 1, wherein the transmitter selects target bit states of a data frame corresponding to the protocol among a plurality of bit states to set the protocol.

3. The CAN controller of claim 2, wherein the protocol generator sequentially transitions each of the target bit states to determine a data frame of the transmission information.

4. The CAN controller of claim 2, wherein the protocol generator selects one of a CAN 2.0 A protocol, a CAN 2.0 B protocol, a CAN 2.0 A FD protocol, and a CAN 2.0 B FD protocol and selects the target bit states based on the selected protocol.

5. The CAN controller of claim 2, wherein the receiver comprises a protocol analyzer for sequentially transitioning the target bit states to analyze the reception information.

6. The CAN controller of claim 1, wherein the receiver comprises:
    a masking filter register configured to determine whether to provide the reception information to the reception FIFO memory based on the identification data of the reception information;
    a baud-rate adjuster configured to adjust a baud-rate of a data frame of the reception information according to the set protocol; and
    an error detector configured to detect an error of the reception information to determine whether to provide the reception information to the reception FIFO memory.

7. The CAN controller of claim 1, further comprising an identification data scanner configured to overwrite the reception information on a memory block of the reception FIFO memory where information having same identification data as the identification data of the reception information is stored, when the bus load is higher than the processor load.

8. The CAN controller of claim 7, further comprising:
    a bus load detector configured to detect the bus load to provide bus load information to the identification data scanner; and
    a processor load detector configured to detect the processor load to provide processor load information to the identification data scanner.

9. The CAN controller of claim 1, further comprising an identification data scanner configured to overwrite the transmission information on a memory block of the transmission FIFO memory where information having same identification data as the identification data of the transmission is stored, when the processor load is higher than the bus load.

10. A data transmission method of a controller Area Network (CAN) controller, the method comprising:
    receiving, by the CAN controller, data information;
    detecting, by the CAN controller, an amount of data information expected to be received;
    searching for, by the CAN controller, a memory block of a First in First out (FIFO) memory where information having same identification data as the identification data of the data information is stored; and
    overwriting, by the CAN controller, the data information on the memory block based on the amount of data information expected to be received.

11. The method of claim 10, wherein the data information is transmission information provided from a processor,
    wherein the detecting of the amount of data information comprises detecting, by the CAN controller, a processor load of the processor.

12. The method of claim 11, further comprising sequentially outputting, by the CAN controller, information stored in the FIFO memory to a CAN bus.

13. The method of claim 11, wherein the detecting of the amount of data information further comprises comparing, by the CAN controller, the processor load with a bus load of a CAN bus,
    wherein the overwriting of the data information comprises overwriting the transmission information when the processor load is greater than the bus load.

14. The method of claim 11, wherein the overwriting of the data information comprises overwriting the transmission information when the processor load is greater than a reference load value.

15. The method of claim 10, wherein the data information is reception information provided from a CAN bus, wherein the detecting of the amount of data information comprises detecting, by the CAN controller, a bus load of the CAN bus.

16. The method of claim 15, further comprising sequentially outputting, by the CAN controller, information stored in the FIFO memory to a processor.

17. The method of claim 15, wherein the detecting of the amount of data information further comprises comparing, by the CAN controller, a load of a processor with the bus load,
wherein the overwriting of the data information comprises overwriting the reception information when the bus load is greater than the processor load.

18. The method of claim 15, wherein the overwriting of the data information comprises overwriting the reception information when the bus load is greater than a reference load value.

* * * * *